Figure 7:
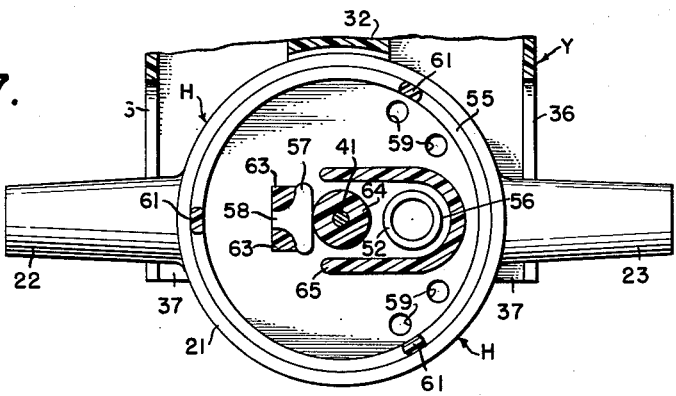

Dec. 29, 1964  B. K. JAQUITH  3,163,047
FLUID MEASURING APPARATUS
Filed July 1, 1963  3 Sheets-Sheet 1
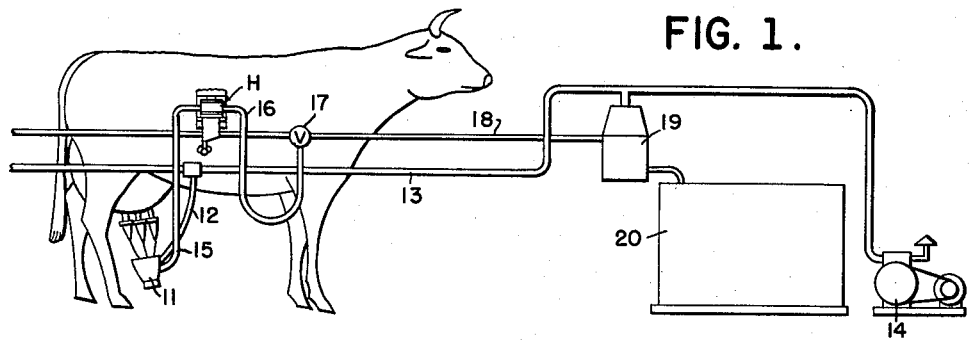
FIG. 1.
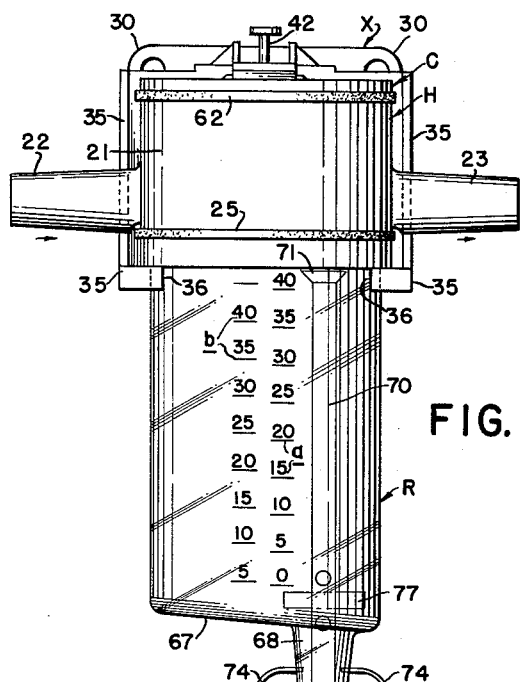
FIG. 2.
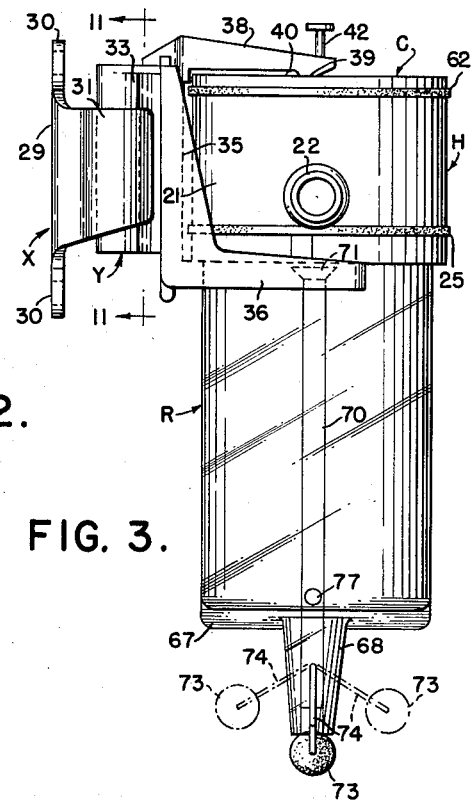
FIG. 3.
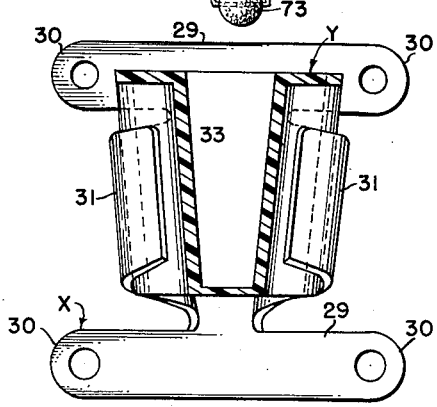
FIG. II.
INVENTOR.
BURTON K. JAQUITH
BY
ATTORNEY

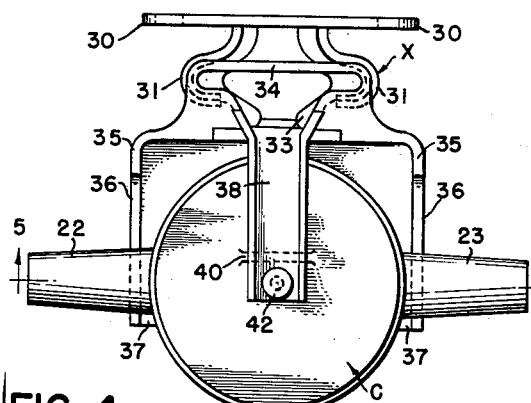
FIG. 4.
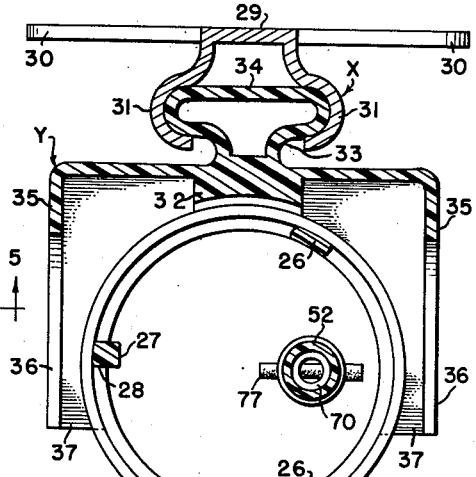
FIG. 9.
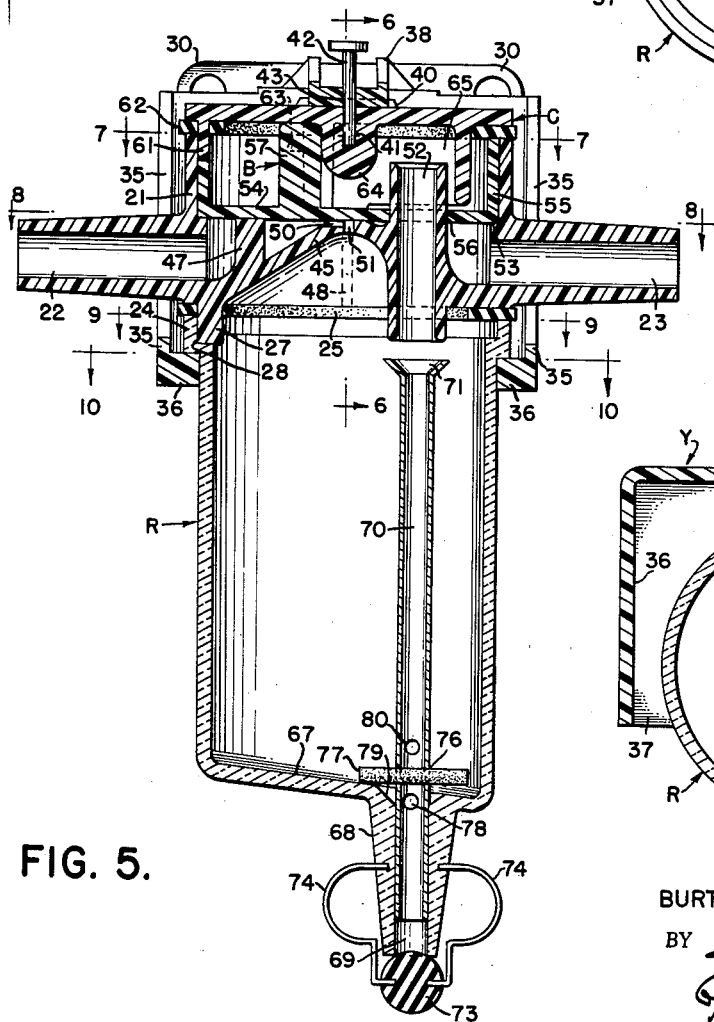
FIG. 5.
FIG. 10.
INVENTOR.
BURTON K. JAQUITH
BY
ATTORNEY Dec. 29, 1964   B. K. JAQUITH   3,163,047
FLUID MEASURING APPARATUS
Filed July 1, 1963   3 Sheets-Sheet 3

INVENTOR.
BURTON K. JAQUITH
BY
ATTORNEY

United States Patent Office 3,163,047
Patented Dec. 29, 1964

3,163,047
FLUID MEASURING APPARATUS
Burton K. Jaquith, Fort Lauderdale, Fla., assignor to Technical Industries, Inc., Fort Lauderdale, Fla., a corporation of Florida
Filed July 1, 1963, Ser. No. 292,014
14 Claims. (Cl. 73—422)

This invention relates to an apparatus for (1) measuring a fluid moving continuously through a conduit system whereby the amount delivered up to any given moment may be accurately determined, and (2) for periodically extracting samples of the moving fluid whereby to accumulate an aliquot solution suitable for test.

In the ensuing description my invention will be discussed, by way of example, in connection with a conventional milking machine conduit system wherein a minus pressure is maintained. The milk yield of a cow is known to vary widely in butter fat content between the beginning and end of a milking operation. It also contains entrapped air in variable amounts, and its advance through a conduit system is often pulsating and surging. The present apparatus enables one to eliminate these factors of irregularity while attaining a high degree of accuracy in a measurement determination of the cumulative amount of the cow's yield at any stage of the operation. This is accomplished by a simple form of device involving no moving parts in its operation. The several units which constitute the apparatus are also susceptible of ready assembly and disassembly whereby to facilitate cleaning and sanitizing thereof. In these respects the apparatus of this invention is a disinct improvement over previous comparable devices.

A second feature of advantage is the provision of a sampler means in connection with the measuring mechanism. This is accomplished with only a minor additional expense. Means for this purpose involve only a periodic extraction from a moving fluid stream of very small amounts thereof, aggregating 2 ounces or so, so as to obtain a truly proportionate sample of the fluid. The aliquot solution so derived is substantially relieved of all the air formerly entrapped therein.

A further feature of advantage is the one-piece mounting provided for the present apparatus. This not only furnishes a fixed sustaining support therefor, but acts to tightly hold together in operative relation the several units comprised in its assembly. The mounting utilizes a pair of spring jaws which frictionally clamp between them a lower element of the assembly and also afford a positive sustaining support therefor; also a spring arm which exerts a downward force on a top element in the assembly whereby to hold it firmly in its operative position, this arm also including means for establishing a positive lock between itself and the element which it engages. The use of this improved mounting assures a fixed and certain support for the apparatus when connected operatively into a fluid conduit system, yet facilitates its removal whenever desired for purposes of cleaning, sanitizing, or otherwise.

Figure 6:
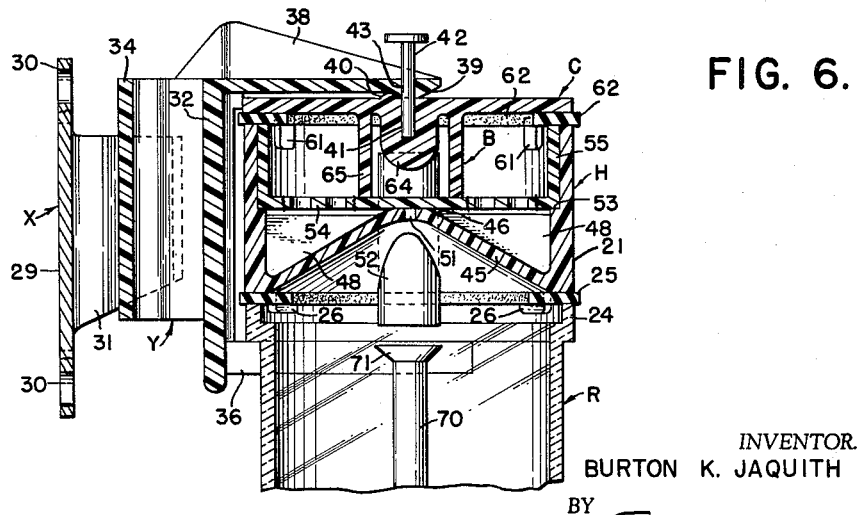

These and other objects and advantages may be realized in full measure from the apparatus of this invention as herein described in detail, taken in conjunction with the accompanying drawings wherein is illustrated a preferred embodiment thereof in the manner following:

FIGURE 1 is a diagrammatic view of a conventional milk conduit system wherein the present measuring apparatus is operatively interposed;

FIG. 2 is a front elevation of the apparatus;
FIG. 3 is an elevational view of one side thereof;
FIG. 4 is a top plan view thereof;
FIG. 5 is a longitudinal sectional view, taken on line 5—5 of FIG. 4;
FIG. 6 is a detail in vertical section, taken on line 6—6 of FIG. 5, showing the assembled cap, baffle and head units as they appear when applied to the upper end of a measuring cup;

FIGS. 7, 8, 9 and 10 are horizontal sections through the apparatus taken, respectively, on lines 7—7, 8—8, 9—9 and 10—10 of FIG. 5; and FIG. 11 is a detail in section, taken on line 11—11 of FIG. 3, showing one form of mounting structure suitable for support of the present apparatus.

In FIG. 1 there is illustrated a closed conduit system through which a pulsating stream of fluid is drawn in response to operation of a vacuum pump. Such a system is more or less common with present day milking machines. It comprises a claw 11 having teat cups applicable to the udder of a cow and provided with a flexible connection 12 leading to the airline 13 and a vacuum pump 14; also a flexible connection 15 from the claw leading to a head unit H which, through the medium of a further flexible connection 16 and a shut-off valve 17, is interposed in the milk line 18 leading to a releaser 19 (for separating air from the milk) en route to the tank 20 wherein the accumulating milk is refrigerated and stored. Into and through such a conduit system, which is closed and wherein a minus pressure is constantly maintained, the milk is drawn while pulsated in response to operation of the vacuum pump. To determine with a high degree of accuracy the weight of the milk delivered at the source, i.e., the yield of the cow, while the milk is passing uninterruptedly to the storage tank, a suitable mechanism for this purpose is built into the present apparatus as per the description following.

The head unit H which is assembled with a baffle unit B interiorly thereof is normally covered over by a cap C, these three units being referred to collectively as the head assembly. The head unit itself is formed with a circular wall 21 through which are inlet and outlet ports 22 and 23 respectively, communicating with a pair of outwardly extended diametric inlet and outlet nipples. The flexible connection 15 is joined to the inlet nipple 22, the outlet nipple 23 being joined to the connection 16 whereby milk admitted into the head is thereafter free for discharge therefrom to join the milk stream moving through the line 18. An outwardly offset collar 24 formed peripherally at the upper end of a cylindrical receptacle R in the form of a cup, provides an upwardly facing seat for a sealing gasket 25 whereon may be rested the bottom edge of the head wall 21. A plurality of circumferentially spaced lugs 26 depend from the head and through the gasket to lie just inwardly of the collar, thereby to center the head with respect to the cup when assembled therewith. As shown, one of these lugs, identified as 27, is then engaged with a notch 28 formed peripherally of the collar to lock the head relative thereto in a fixed rotative position. The head, baffle and cap units of the head assembly are readily separable, whenever required for cleaning, sanitizing or other purposes and, largely for sanitary reasons, they are desirably produced from a suitable plastic material which, in the case of the cup, should be transparent to a substantial degree.

The head assembly, when mounted on to the cup, may be conveniently supported in a fixed operative position wherein the several units are also maintained in close fitting relation with each other through the medium of a two-unit mounting of advantageous construction. One unit X of this mounting (see FIG. 11) comprises a base plate 29 with outstanding apertured ears 30 for reception of screws or other fastening devices (not shown) whereby it may be immovably supported upon a wall, stanchion, or other fixed structure close by. Opposite edge portions of the base plate 29 are extended laterally and forwardly to form a pair of cheeks 31 whose free edge portions are inturned toward each other (see FIG. 9). These cheeks remain spaced apart to provide an elongated gap between them, and are furthermore inclined with respect to each other so as to define an intervening space which tapers from top to bottom, the maximum dimension being at the top. This unit of the mounting is tantamount to a hook, and will at times be so referred to herein.

The second unit Y of the mounting is, in effect, a bracket having a vertical body 32 (see FIG. 9) from which is rearwardly extended a web 33 supporting an integral tongue 34 which is tapered from top to bottom in conformity with the space between the cheeks 31 so that, with the web entered into the gap between the cheeks, the tongue will fit closely therein when shifted downwardly into seating position. The bracket is desirably made of a suitable plastic material having the property of limited resilience. Extending oppositely from the bracket body are walls 35 joined at their bottoms to a pair of spaced parallel legs 36 supporting between them two horizontally disposed arcuate jaws 37 defining cup-engaging faces extending through slightly more than 180 degrees. Also extending forwardly in a horizontal plane from the bracket body 32 adjacent its top is an arm 38 (see FIG. 3) adapted to overlie the cap C when the head assembly is operatively positioned upon its mounting, i.e., with the jaws 37 underlying the offset collar 24 of the cup R and in pressure engagement with the walls thereof to provide a sustaining support therefor.

As shown best in FIG. 6, the arm 38 is beveled on its under side adjacent its free end where it is formed with a depending contact tip 39 adapted to bear with pressure upon the cap C at substantially its center point. A small rib 40 upstands from the cap at a point adjacent the contact tip 39 for engagement therewith to restrain movement of the head assembly outwardly and away from the arm, thereby assuring retention of the entire apparatus upon the seat provided therefor between the two arcuate jaws 37. Further to lock the apparatus fixedly in this position, the cap is provided with an axial socket 41 (FIG. 6) for receiving a gravity pin 42 of stainless steel or the like which is slidably supported in an aperture 43 formed through the tip portion 39 of the arm. Because of the resilience inherent in the jaws 37 and arm 38 of the mounting unit Y, the apparatus, when advanced to its seating position upon the supporting bracket, is required to deflect these three bracket elements both with respect to each other and to the head H. As a result, when seated in the bracket, the head assembly is subject continuously to opposing pressure forces sufficient to hold the apparatus fixedly in place, yet not so strongly as to prevent its removal from the bracket in response to an adequate counterforce when manually applied.

Figure 8:
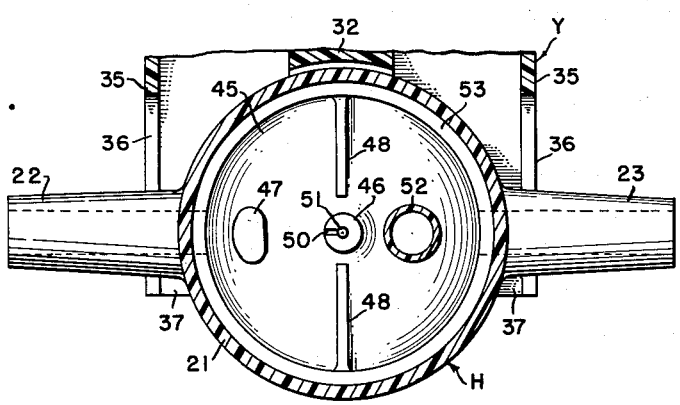

Referring now to the head unit per se, a floor 45 which is extended continuously between its peripheral walls 21 is joined integrally thereto at a relatively low down point. This floor is upwardly inclined in the form of a cone which is truncated to provide a relatively small flat summit 46. Opposite the inlet port 22 and in spaced relation thereto is a deflecting baffle post 47 rising from the floor to a level about even with the cone summit 46 and provided with a convex face confronting incoming fluid to facilitate its separation into two diverging streams. Two radial weirs 48 are extended upwardly from the cone floor 45 to a height slightly below the summit 46. These weirs may be diametrically opposed, as shown in FIG. 8, to impound the flowing milk into two pools whose depths increase progressively toward the peripheral walls 21 of the head (FIG. 6). By providing two aligned weirs extended transversely of the milk flow, an even and uniform distribution of the milk on opposite sides of the cone summit 46 is assured. This is a factor conducing to accuracy in the measurement of fluid moving through the head. In the top face of the summit is formed a radial channel 50 of small cross sectional area which is aligned with the inlet and outlet ports 22 and 23 of the head to communicate with an axial orifice 51 opening into the space below the floor 45. Carried by and extending through this floor beyond the weirs at a point oppositely of the outlet port 23 is an upstanding orifice tube 52 whose upper end lies well above the summit 46. The lower end of this orifice tube also terminates well below the conical floor for reasons which will later be explained.

A ledge 53 which extends circumferentially around the inner face of the head peripheral walls 21 at a level about even with the cone summit 46 provides marginal support for a disk 54 forming a partition which may also rest upon the summit. Circular walls 55 which upstand from the disk adjacent its periphery terminate about evenly with the circular walls 21 of the housing H. When positioned on the ledge 53, this partition separates the head into upper and lower chambers. A baffle wall 57 upstands from the partition, off-center thereof, at a point diametrically opposite the post 52, a web 58 being formed upon the wall face which is remote from the post (see FIG. 7). A few ports 59 having a desired aggregate area are formed through the partition at points relatively close to its periphery for passage of milk therethrough, either up or down, to meet varying conditions present within the apparatus. This partition is freely removable from the head H whenever desired for cleaning or other purposes.

Coming now to the cap C whose diameter closely approximates that of the head, means to center one axially with respect to the other may be provided by a plurality of circumferentially spaced lugs 61 depending from the cap to engage with the inner face of the head walls 21. A sealing gasket 62 with openings for these lugs to pass therethrough is adapted for positioning between the tops of the walls 21 and 55 and the marginal portion of the cap thereabove. When downward pressure is exerted upon the cap to hold it firmly upon the head, the gasket will serve effectively as a seal therebetween. Depending from the cap under face is a pair of spaced nodes 63 (see FIG. 7) so located as to engage opposite faces of the web 58 of the baffle wall 57 when the cap occupies its correct rotative position upon the head; an axial boss 64 into which the pin socket 41 may be extended; and a wall 65 having a U-contour with parallel straight portions extending away from the nodes 63 past the boss 64 and on toward the opposite side of the disk where they are joined together through a curved portion (FIG. 7). When a cap so constructed is fitted on to the head H in correct rotative position, the orifice tube 52 will lie within the confines of the U-wall 65 close to the curved portion thereof. Its two straight portions will then terminate short of the baffle wall 57. These several walls and baffles provide desirable restrictions to movements of fluid into and out of the chamber above the disk, as will be noted more fully hereinafter.

The collecting cup R remains to be considered. It is formed desirably with a bottom 67 which slants downwardly toward one side to a low point where a depending spigot 68 is provided. A cylindical opening 69 extending axially through the spigot in alignment with the orifice tube 52 thereabove provides a supporting guide for sliding movements of a vent tube 70 which is extended vertically within the cup to a point opposite the lower end of the orifice tube but short thereof when in its normal down position. At its upper end the vent tube is shown as outwardly flared at 71 to provide, in effect, a mouth to receive milk dropping thereinto from the orifice tube thereabove. A closure for the spigot is also provided, the means suggested for this purpose being a resilient ball 73 carried at the lower end of a wire bail 74 having its upper inturned ends journaled within the spigot body for pivotal support therein.

Formed in the lower portion of the vent tube walls is a pair of oppositely disposed ports 76 for receiving therethrough a close-fitting plug 77 which shuts off endwise communication through the plug at this point. Desirably this plug is made of material having some degree of resiliency whereby to be amenable to slight compression when fitted in place. Opposite end portions of the plug remain protruded transversely of the tube in position to engage the inner face of the cup bottom, cooperating therewith to fix the lowermost position of the vent tube within the cup. When in this position, a second port 78 formed through the tube walls just below the plug 77 stands oppositely of a beveled mouth 79 at the upper end of the spigot axial opening 69. This port establishes communication between the cup and the interior of the vent tube in all vertical positions of the latter. When in its uppermost position, the flared mouth 71 at the top of the vent tube is engaged with the lower end of the orifice tube 52, and to provide for communication between the cup and the vent tube interiorly thereof above the plug 77, a third port 80 is formed through the tube walls just above the plug. Desirably the ports 78 and 80 are duplex in that each consists of two ports, one arranged oppositely of the other, at points 180 degrees apart, whereby to increase the area of port opening in each case.

When the apparatus is assembled with the plug 77 fitted through the vent tube and the latter fitted into the spigot, the head assembly is placed over the cup and the assembled apparatus is then snapped into the mounting frame therefor where it is connected into the minus-pressure conduit system as hereinbefore explained. The operator should then swing the ball valve 73 away from its seat for a few seconds, then restore it to its closed position again to cause the fluid level to register opposite "O" at the bottom of a scale of figures *a* arranged in a vertical column upon the cup walls (see FIG. 2). As the milking operation gets under way, a small quantity of fluid, proportionate to that passing through the apparatus, will be diverted into the cup, the cumulative volume of the fluid so passed being indicated by its rising level therein when read against the figures in the scale *a*.

A separate scale of figures *b*, arranged in a second vertical column upon the cup walls is to be read by the operator at the conclusion of a milking operation if and when an aliquot solution is to be withdrawn for testing. Since a residue of fluid will then be remaining in the cup, the sampling indicating cycle will start with a fluid level different from that which obtains when a measuring cycle is started, hence the requirement for differences in the two scales *a* and *b*. To obtain a sample for test, the ball valve 73 should first be shifted off its seat for a few seconds; the prevailing negative pressure condition in the apparatus then permits air to enter into the vent tube 70 and out through the lower ports 78, and in rising through the body of the milk the resulting agitation thereof will provide an aliquot solution. This air pressure thereby forces the liquid down to the level of the upper ports 80 to be driven therethrough into the vent tube and thence upwardly therein and outwardly therefrom through its top end for discharge into the head assembly of the apparatus. This period of negative pressure should desirably continue for three seconds or so after which the vacuum supply valve 17 is closed to permit the vent tube to return to its normal down position, thereby permitting the sample for test to be drained off through the lower ports 78 and through the spigot into a sample bottle or tube. This desired sample will be exactly one ounce regardless of the total amount accumulated within the cup, assuming that the upper ports 80 are positioned properly for that purpose.

The volume of milk accumulated in the cup R is accurately predetermined by the conditions created within the head H while the milk is advancing therethrough concurrently with extraction of small amounts thereof. The total amount so extracted is always volumetrically proportionate to that of the fluid body passing through the head unit of the apparatus. In this way a true proportionate sample of the milk, taken more or less continuously during the entire milking operation, is obtained with assurance that it will accurately represent the exact constituency of the full yield of milk from the producing source. Such an aliquot solution will reveal the butter fat content, as well as other constituents present in the entire production, whether or not they may vary in ratio during various stages of the milking operation. The sequestration of the aliquot solution in the manner herein described proceeds while the condition of minus pressure remains constant and undisturbed throughout the conduit system.

At the conclusion of the milking operation it is desirable to return into the conduit system all milk accumulated in the cup R in excess of a predetermined amount that is to be reserved for test. This may be done without impairing the vacuum existing in the conduit lines by swinging the ball valve 73 off its seat to admit air into the cup. The vent tube 70 will then be impelled to rise in response to the pressure differentials thus created, and in the up position its flaring open end 71 will abut the lower end of the orifice tube 52 to restrict to a single path all communication between the conduit system and the cup R. The port 80 which communicates with the interior of the vent tube remains open at all times. The air entering through the spigot 68 can advance only through the port 78 to enter into the body of the milk accumulated within the cup and up through to the top thereof. The milk so aerated is thereby stirred up and agitated to assure uniformity in its constituency at every point within its body. After passing upwardly through the milk body, the air fills the space thereabove to exert a downward pressure thereupon, thereby driving the milk out of the cup through the port 80, vent tube 70, and orifice tube 52 into the upper chamber of the head H from whence it is free to drain out through the holes 59 into the lower head chamber to join the milk stream proceeding toward the outlet 23 for re-entry into the conduit system; only that portion of the milk body in the bottom portion of the cup, below the lowermost port 78, remains in the cup. Having removed from the cup all fluid over and above that required for test, the milk valve 17 in the conduit system is also closed, thereby allowing the milk claw 11 to admit air thereinto whereby to produce a condition of atmospheric pressure therein. The vent tube 70 will thereupon drop to its lowermost position, permitting the aliquot solution reserved for test to drain out through the ports 78 and 80 into a test tube or other receptacle. At this stage the ball valve 73 for the spigot is ready to be closed and the milk valve 17 re-opened, thereby conditioning the system and units therein for a succeeding operation.

In a normal milking operation, milk drawn into the apparatus through the inlet 22 will enter the head unit in the form of an aerated stream which is initially divided by the baffle post (see FIG. 8), thereby preventing its direct approach to the apical orifice 51. Instead, the advancing stream is deflected laterally and oppositely away from this orifice to generate an ensuing centrifugal effect. These deflections in the stream flow are greater with increase in the flow, and vice versa. In practice, a large proportion of the fluid so deflected will by-pass the orifice and spill over the two weirs 48 into the head chamber proximate to the outlet port 23 through which it is then free to continue its flow to join with the fluid in the line 18.

It is to be noted that the vertical area of each weir decreases to zero toward the center of the conical floor. The resulting variation in resistance which such a wall imposes to movement of fluid through the head corresponds closely with variations in the fluid volume advancing into the head. These are important factors in the attainment of an accurate measurement of the amount of fluid passing through an apparatus of the kind here under discussion. The problem of accuracy is compounded by (1) the presence in variable amounts of entrapped air in the fluid, (2) its viscosity, and (3) its rate of flow through the apparatus. Flow rate is a combination of mass and velocity; also high flow rate compounds the centrifugal effect of a conical shape interposed in a stream. As the proportionate extraction of an apical orifice interposed in such a stream is related to its velocity of flow, I propose to utilize this velocity and mass as a negating factor, and do so successfully in the present apparatus. As a result, measurement of the passing fluid is noticeably improved in accuracy.

During a normal milking operation, fluid passing into and out of the head unit H may rise through its partition 54 to enter into the baffle unit B, the amount depending upon such factors as its velocity of flow, its degree of aeration, etc. There is usually a release of considerable overspray and air whose presence would otherwise be detrimental to the maintenance of an equalized pressure differential between that existing in the collecting cup and the head unit. Any such pressure differential, if significant, would influence the extraction rate of the fluid passing the apical orifice and, because some of this aerated fluid would inevitably tend to enter the open upper end of the orifice tube 52 and then pass down into the collecting cup, the accuracy of gravity measurement readings of the fluid level therewithin would be impaired. To reduce this unfavorable condition to a negligible point, I utilize the upstanding walls 57 and 65 to interfere with free circulation of overspray and fluid within the head unit chamber above the disk 55, sufficiently to prevent its uncontrolled diffusion therewithin which is further controlled by (1) the boss 64 depending axially into this chamber and (2) the U-wall 65 which, in conjunction with the boss, provides a substantially complete enclosure for the upper end portion of the orifice tube 52. Fluid may reach this tube to enter its open upper end only by passing through two sets of relatively narrow gaps between the two ends of this wall 65 and (1) the proximate ends of the baffle wall 57 and (2) the boss 64. The disturbed conditions arising from entrapped air and spray are therefore confined mainly to the area outside of the U-wall 65; fluid entering into the space interiorly thereof is relatively calm and placid.

Due to normal pulsations and other factors which are present throughout the milking operation, the fluid is almost never advanced in a smooth and even flow; rather, it tends frequently to surge with constant variations in the velocity of its flow and entrapped air content. These erratic conditions are largely, but not entirely, eliminated from the fluid that is advanced into the baffle unit which at times may occupy most of the space therewithin and at other times very little, if any, of such space. It is mainly when the fluid volume within this chamber is at a low point that air released from the fluid escapes downwardly through the ports 59 into the head chamber therebelow to enter the stream of outgoing fluid leaving through the outlet 23.

The mounting for the apparatus, as hereinbefore described, serves the double purpose of a support and of a clamp whereby the head, baffle and cap units are held together as a single unit. The resiliency of the jaws 37 and arm 38 which engages the head assembly also permits the apparatus to be snapped into and out of its supporting position relative to the mounting. A further feature is the gravity pin lock which, until pulled out, positively prevents removal of the apparatus from its mounting, this lock comprising a socketed boss which depends from the cap into the upper head chamber to coact with the shielding wall therein in preventing overspray from entering the orifice tube. With the apparatus so supported, there need be no concern concerning (1) its retention in proper position and (2) its assembled units remaining securely clamped together in operative relationship.

I claim:

1. In an apparatus of the kind described, the combination with a collecting cup surmounted by a chambered head having oppositely disposed inlet and outlet openings in communication with a conduit system, of a floor in the form of an upwardly rising cone extending continuously within the head between its peripheral walls with the floor base disposed at an elevation below the inlet and outlet openings, the floor being provided therethrough with an apical orifice into which only a predetermined amount of a fluid stream passing through the head is gravity-deflected to drop into the collecting cup therebelow.

2. An apparatus according to claim 1 wherein the cone apex is a flat summit and a radial fluid-receiving and guiding channel, aligned with the inlet and outlet openings, is formed in the summit in communication with the apical orifice.

3. An apparatus according to claim 1 wherein weirs are extended radially of the cone, transversely of the stream flow through the head, to a lesser height than the cone apex to impound fluid pools each having a surface of sector contour and a depth which increases progressively toward the head periphery.

4. An apparatus according to claim 1 wherein the cone apex is a flat summit and a radial fluid-receiving channel, aligned with the inlet and outlet openings, is formed in the summit in communication with the apical orifice, and weirs are extended radially of the cone, transversely of the stream flow through the head, to a lesser height than the summit, to impound fluid pools each having a surface of sector contour and a depth which increases progressively toward the head periphery.

5. An apparatus according to claim 1 wherein a baffle post upstands from the cone oppositely of the inlet opening to deflect at that point the incoming fluid into two diverging streams whose movements are decelerated before reuniting on the far side of the baffle post.

6. An apparatus according to claim 1 wherein the cone apex is a flat summit formed with a radially-extending fluid-receiving channel aligned with the inlet and outlet openings and communicating with the apical orifice, and a baffle post upstands from the cone oppositely of the inlet opening to deflect the incoming fluid into two diverging streams whose movements are decelerated before reuniting on the far side of the baffle post.

7. In an apparatus of the kind described, the combination with a collecting cup surmounted by a chambered head having oppositely disposed inlet and outlet openings in communication with a fluid conduit system, of a floor extending continuously within the head between its peripheral walls with the floor edge portions disposed at an elevation below the inlet and outlet openings, there being an orifice in the line of fluid movement between the inlet and outlet openings extending through the floor whereby to permit a controlled extraction of fluid to pass therethrough and enter into the collecting cup for accumulation therein, a partition supported within the head at an elevation above the floor and above the inlet and outlet openings to define a chamber therewithin, a cap applied to the head above the partition in spaced relation thereto to define therewith an upper chamber within the head, an orifice tube fixedly extending from a point above the partition to a point below the floor and open at both ends to provide communication between the upper chamber and the collecting cup, means shielding the open upper end of the orifice tube from contact with overspray within the upper chamber, and communicating means extending through the partition exteriorly of the shielding means to permit fluid to rise into the upper chamber and drain downwardly therefrom in response to varying pressures and flow velocities of fluid entering into the head.

8. An apparatus according to claim 7 wherein the orifice tube is carried by the head and the partition is apertured for accommodation of said tube whereby it is permitted to extend above the partition.

9. An apparatus according to claim 7 wherein the shielding means is carried by the cap, and a baffle upstands from the partition to cooperate with the shielding means to prevent overspray from contacting with the orifice tube.

10. An apparatus according to claim 7 wherein the shielding means is a U-wall adapted to enclose the orifice tube through 180 degrees with opposite end portions of the wall extending in parallelity past the tube to extend the shielding protection therefor.

11. An apparatus according to claim 7 wherein the shielding means is a U-wall adapted to enclose the orifice tube through 180 degrees with opposite end portions of the wall extending in parallelity past the tube to extend the shielding protection therefor, and a baffle is disposed opposite the open end of the U-wall to provide thereat a partial closure between its opposite end portions.

12. An apparatus according to claim 7 wherein the shielding means is a U-wall depending from the cap and carried thereby, a baffle upstands from the partition in fixed relation thereto, and means carried by the cap is adapted to engage the baffle to secure the cap in a fixed rotative position relative thereto.

13. An apparatus according to claim 7 wherein the orifice tube is fixedly carried by the head and extended through the partition to fix the rotative position thereof, and wherein the shielding means depends from the cap in position to engage the orifice tube to confine the cap closely into a fixed position relative to the partition and to the head.

14. An apparatus according to claim 7 wherein a condition of minus pressure is maintained in the conduit system, a valved spigot depending from the cup bottom is provided with a vertical opening in line with the orifice tube thereabove, and a vertical vent tube is positioned with its lower end portion guidingly supported in a fixed lower position within the spigot opening and with its top end normally below the orifice tube in spaced relation thereto, the vent tube being provided through its walls with a first opening to establish communication between itself and the surrounding cup, and a second opening below the first to establish communication between the atmosphere and the cup, there being means between the two openings within the vent tube to prevent communication therebetween, the arrangement being such that, when the spigot is opened, the resulting pressure differentials will cause the vent tube to rise and engage the orifice tube thereabove whereby to confine therethrough all communication between the cup and conduit system.

References Cited by the Examiner
UNITED STATES PATENTS

| | | | |
|---|---|---|---|
| 1,294,883 | 2/19 | Dixon et al. | 248—312 |
| 2,917,926 | 12/59 | Jaquith | 73—422 |
| 2,966,323 | 12/60 | Darr | 248—224 X |
| 3,045,493 | 6/62 | Seaborne | 73—202 X |

FOREIGN PATENTS 651,822 4/51 Great Britain.

RICHARD C. QUEISSER, *Primary Examiner.*

DAVID SCHONBERG, *Examiner.*